56. HARVESTERS EXAMINERS ROOM
45-3

Sheet 1. 2. Sheets

S. J. Wallace.

Grain Binder.

No. 2336 Reissued Aug. 14, 1866.

Witnesses:
R. T. Campbell
Gustave Dietrich

Inventor
Samuel J. Wallace
by his Attys
Mason, Fenwick & Lawrence 45-3

EXAMINER'S ROOM.

Sheet 2. 2 Sheets.

S. J. Wallace.

Grain Binder.

№ 2336.

Reissued Aug. 14, 1866

Witnesses

R. T. Campbell
Gustave Dietrich

Inventor

Samuel J. Wallace
by his Attys
Mason, Fenwick & Lawrence

UNITED STATES PATENT OFFICE.

SAMUEL JACOB WALLACE, OF CARTHAGE, ILLINOIS.

IMPROVEMENT IN GRAIN-BINDERS.

*Specification forming part of Letters Patent No.* 42,322, *dated April* 12, 1864; *reissue No.* 2,336, *dated August* 14, 1866.

*To all whom it may concern:*

Be it known that I, SAMUEL J. WALLACE, of Carthage, in the county of Hancock and State of Illinois, have invented a new and Improved Grain-Binder; and I do hereby declare the following to be a full, clear, and exact description thereof, reference being had to the accompanying drawings, and to the letters of reference marked thereon, in which—

Figure 1:
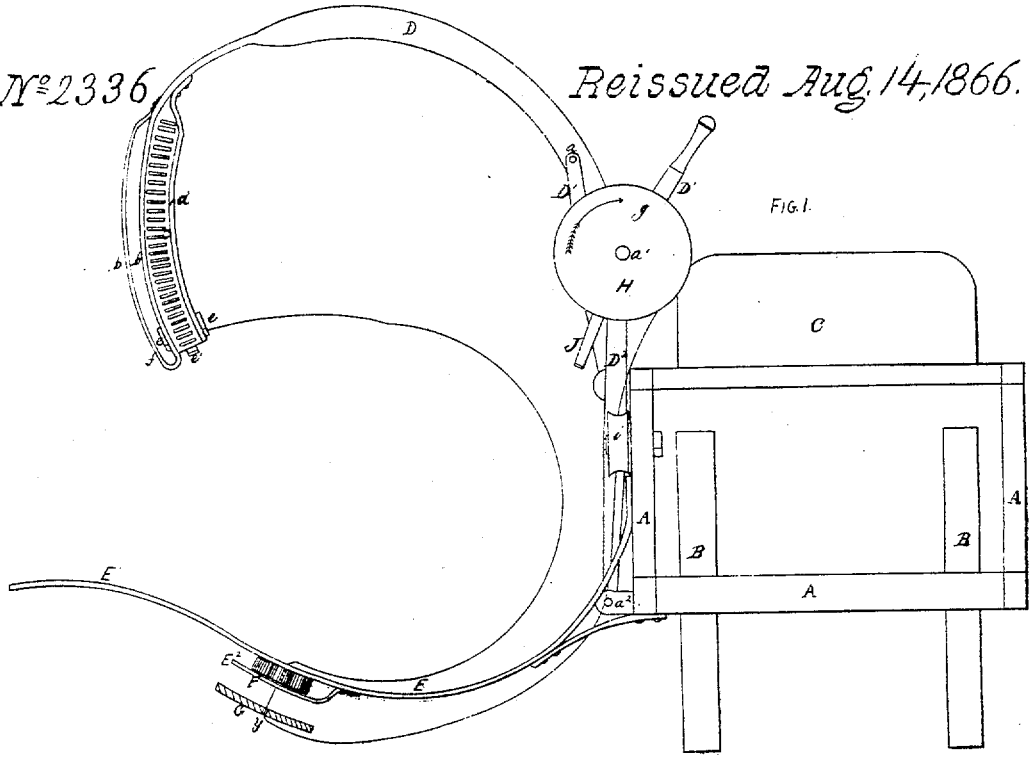
Figure 2:
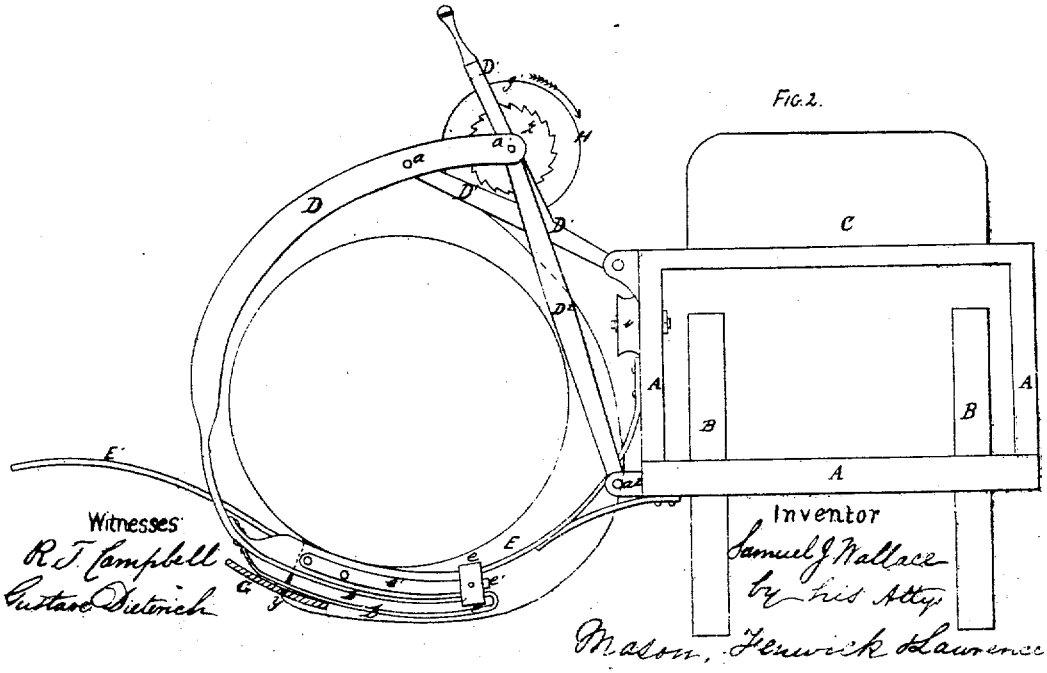
Figure 3:
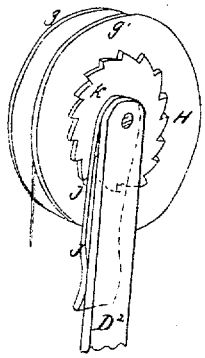
Figure 4:
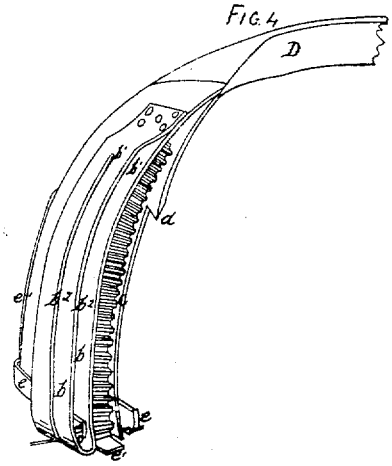
Figure 5:
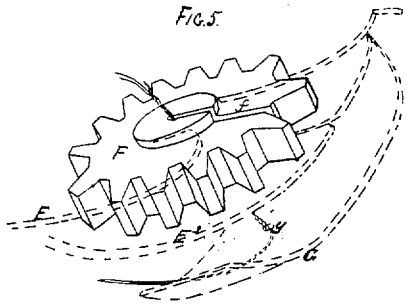

Figure 1 is a front elevation of my improved grain-binder attached to the draft or wheel frame of a reaping-machine, showing the several parts in their relative positions for receiving the sheaf of grain to be bound. Fig. 2 is a rear elevation, showing the same parts in their relative positions in the act of compressing and securing the band around the sheaf. Fig. 3, Sheet 2, is a perspective view of the reel detached from the binding apparatus, showing the curved arm and tooth for securing the reel to its axis for taking up the slack strand. Fig. 4, Sheet 2, shows in detail the slotted plates, band-cutter, and spring holding-fingers of the curved swinging arms. Fig. 5, Sheet 2, is an enlarged perspective view of the slotted twister detached from the binder.

Similar letters of reference indicate corresponding parts in the several figures.

This invention has for its object the compressing and binding of grain into sheaves as fast as it is cut by the reaping-machine. The binding apparatus is designed to be attached to the draft-frame of the reaper, and in such relation to the driver's seat that the driver can control the binding apparatus with very little extra labor, and by the simple operation of a lever.

To enable others skilled in the art to make and use my invention, I will proceed to describe its construction and operation.

A is the usual draft-frame of a reaping-machine, supported on the wheels B B′, and C is the driver's seat, which is supported on the frame A in the usual position for the driver's seat of a reaping-machine. D is a curved binding-arm, pivoted at *a* to a bifurcating lever, $D^1$, and again at $a^1$ to a long vibrating upright arm, $D^2$, which latter is pivoted at $a^2$ to one side of the frame A. The bifurcated lever $D^1$ is pivoted at its lower end to the side of the driver's seat, and one arm of this lever extends up and forms a handle, which is in convenient position for the driver, who can perform the operation of binding the grain by giving a vibrating movement to this hand-lever.

Below the curved swinging arm D, and in, or nearly in, a vertical plane therewith, is arranged a curved bed, E, which is secured and properly braced at one end to the frame A of the reaper. This curved bed E is intended to receive the loose grain from the platform of the reaper and retain the sheaf until the binding operation is effected; and to this end this bed E has a curved tongue, $E^1$, projecting from its outer end, over which the loose grain passes as it is being raked into the binding apparatus.

On the swinging end of the binding-arm D the wire-band holder is secured, which consists of two curved slotted plates, *b b*, secured together at their extreme ends, as shown in Fig. 4 of the drawings, and having a perforation, $b^1$, formed at the upper termini of the slots $b^2$ $b^2$, for receiving the outer or counter twist of the wire band, as will be hereinafter described.

Along one side of the swinging end of the curved bar D is a curved toothed rack, *c*, the length of which is equal to the length of the slots in plates *b b*, and at or near the terminus of the upper end of this rack *c* is a knife, *d*, which inclines from this rack downward, as shown in Fig. 4 of the drawings. At the extreme outer end of the swinging arm D, and on each side of this arm, are two spring-fingers, *e e*, which are secured to a spring, *e′*, the lower end of which is bent at right angles under the end of arm D, and projects forward a suitable distance to be acted upon by the curved edge of a plate, $E^2$, which is secured to the lower side of bed E, and thrusts this spring outward, thereby pushing back the spring-fingers *e e*, immediately after these fingers have put the end of the wire which is carried by the arm D into the radial slot in the twister F.

The twister F, which twists the two ends of the wire band together after the bundle of grain has been sufficiently compressed, consists of a toothed wheel, F, having its axial bearings in the bed-plate E and the curved thrusting-plate $E^2$, as shown in Figs. 1 and 5 of the drawings. This wheel F has a radial slot, *f*, cut into it, extending from its axis to its circumference, said slot being of sufficient size to receive two wires to be twisted together, as will be further described hereinafter. This twister F is arranged on the outer end of the bed E, in such a relation to the curved rack *c* on the binding-arm D that the teeth of this rack will engage with those of the twister F and rotate the twister, for the purpose of giving the tie-twist to the wire band, while the band is drawn tightly around the bundle of grain.

G is a curved plate, which is secured at its forward end to the extreme outer end of the curved bed E, and which extends from this point downward and backward, so as to have a sufficient space between the bottom of plate E and this plate G to allow the curved plates *b b* to pass down and present the band-wire to the twister F, to be twisted together.

The band-carrying reel H consists of two circular disks, *g g'*, which are connected to a hub in the usual manner of constructing a reel or spool. This reel is allowed to turn freely on its axis $a^1$ when the arm D rises; but when the arm D commences its downward motion this reel is fixed to its axis and made to turn backward, as will be further described.

Between the disks *g g'* the wire which is used for binding the grain is wound, and carried thence to the friction-roller *i*, down through the curved bed E; thence under this bed to the outside of, and through a hole, *y*, in the plate G; and, finally, the end of this wire is held firmly between the slots $b^2$ $b^2$ in curved plates *b b*, as shown in Fig. 1 of the drawings.

The reel-disk *g'* has a toothed wheel, *k*, secured to its outside surface, concentrically with its axis, and between this disk *g'* and the pivoted end of the swinging arm D is fixed to the pivot $a^1$ a bent arm, J, which is actuated by the hand-lever $D^1$ so as to cause a pin, *j*, on lever J to engage with the teeth of wheel *k*, and fix it to the axis $a^1$, thus rotating the reel backward, and drawing the band tightly around the sheaf preparatory to cutting the wires and severing the bundle from the machine. The operation of the curved arm J, with its pin *j*, upon the toothed or ratchet wheel *k* is like that of a common pawl and ratchet, with this addition: the curved arm J, by its lower or curved end pressing against the side of the long arm $D^2$ when this arm is moved outward, engages the tooth or pin *j* with the ratchet-wheel *k*, and when the long arm $D^2$ is moved backward or toward the driver, the pawl-arm J disengages the tooth *j* from the ratchet-wheel *k*, and allows the wire to unwind from the reel.

Besides tightening the band around the sheaf, by giving the reel a backward rotation, as just described, it is further tightened, in consequence of the reel being raised by the long arm $D^2$, as this arm describes its arc from the pivot $a^2$, and the curved arm advances to the twister F.

The operation of my invention is as follows: The band-wire, (wire being used instead of twine,) which is represented in the drawings, is wound upon the reel, and carried from thence under the bed E toward the outer end of this bed, and passed through plate G at a point which is coincident with the axis of the twister F. This band-wire is then attached to the slotted plates *b b* by passing the end of the wire through the slot $b^2$ and twisting it into a knot, so as to prevent the end of the wire from slipping through the slot again.

The hand-lever $D^1$ is now drawn inward toward the driver by him, and the several parts of my improved binder assume the positions shown in Fig. 1, ready to receive the loose grain. The grain is now raked from the platform of the reaper (in any of the usual modes of raking grain from the platform of reapers,) against the slack wire, carrying with it the slack wire into the curved bed E, and at the same operation drawing the wire through slot *f* into the axis of twister F. When a sufficient quantity of grain is thus raked into the binder over the slack binding-wire, the driver forces the hand-lever $D^1$ outward, thus depressing the outer end of arm D, and carrying the free end of the wire over the confined bundle of grain.

The end of the wire which is held by the arm D is now forced into the axis of the twister F, and held down in its place on both sides of this twister by the spring-fingers *e e*. The teeth of rack *c* now engage with the twister, rotate it, and cause it to twist the wire tightly around the bundle of confined grain. During this operation the arm D continues to descend, and the reel is caused to rotate backward, so as to take up the slack wire, and thus draw the band tightly, in the manner described, around the sheaf. Immediately the fingers *e e* put the end of the wire into the slot *f* in twister F, and the twister begins to rotate, these fingers are thrust outward, in consequence of the arm *e'* coming in contact with the curved edge of plate $E^2$, and thus allow the twisted wires between the plates G and $E^2$ to pass between the slots in plates *b b*.

The curved arm D still further descends, twisting the wire and compressing the sheaf, until the knife *d* severs the twisted ends of the wire from the upper side of the twister, and thus releases the bound sheaf from the machine.

The arm D, after this operation, begins to ascend, and in this return stroke the twisted end of the wire, which is left in the slot *f* of the twister, is pulled out of the twister by the slotted plates *b b*, and the twisted knot, which is left on the end of the wire, slips through the first slot $b^2$ at the point $b^1$, and is caught between the two plates *b b*, where it is held in a position to be presented to the slot *f* in the twister in the next downward stroke of the arm D.

It will be seen that the slotted plates *b b* and their spring-fingers *e e* hold the free end of the wire firmly, and draw out sufficient slack from the reel to commence the operation of binding. They then unite the ends of the wire in the slot in the twister, and finally grasp the end of the wire again, when it has been cut off, to repeat the operation.

The return stroke of the curved arm D is effected by the driver, who draws the hand-lever $D^1$ toward him, as soon as he finds that the knife *d* has severed the wires which connect the sheaf with the curved bed of the binder.

Having thus fully described my invention, what I claim as new, and desire to secure by Letters Patent, is—

1. A rack, *c*, in combination with arm D, or its equivalent, for giving motion to the twister, substantially as described.

2. The slotted wire-holder on binding-arm D, formed of bent plates *b b*, substantially as described.

3. The spring-fingers *e e* and spring *e'*, for carrying the strand to the twister, and releasing the strand, substantially as described.

4. The spring-fingers *e e* and spring *e'*, in combination with the slotted twister F, operating substantially as described.

5. The binding-arm D, provided with bent plates *b b*, for holding and afterward catching the wire, in combination with the spring-fingers *e e*, for introducing the wire into the twister, substantially as described.

6. The binding-arm D, provided with bent plates *b b*, for holding and afterward catching the wire, in combination with the twister F and spring-fingers *e e*, for introducing the wire into the twister, substantially as described.

7. The cutter *d*, attached to the binding-arm D, and operating in combination with the twister, substantially as described.

8. Effecting the several operations of carrying the strand around the sheaf, drawing up the slack of strand, forming the fastening, and severing the sheaf from the machine, in the manner described, by the action of the lever $D^1$ moved backward and forward, substantially as described.

9. The binding-arm D, in combination with the levers $D^1$ $D^2$, the two latter being pivoted to the arm D, and to the draft-frame of the harvester, on the grain side of the drive wheel, substantially as described.

10. The levers $D^1$ $D^2$, the binding-arm D, and bottom plate E, operating as described, and arranged independently of the grain-platform, and so that the parts can be operated by the driver, substantially as set forth.

11. The reel H, in combination with the ratchet *k* and the levers J and $D^2$, the whole operating substantially in the manner and for the purpose set forth.

12. The binding-arm D, in combination with the levers $D^1$ $D^2$, reel H, plate E, spring-fingers *e e*, slotted twister F, and rack *c*, substantially as described.

SAMUEL JACOB WALLACE.

Attest:
U. G. FERRIS,
A. J. GRIFFITH.